Figure 1:
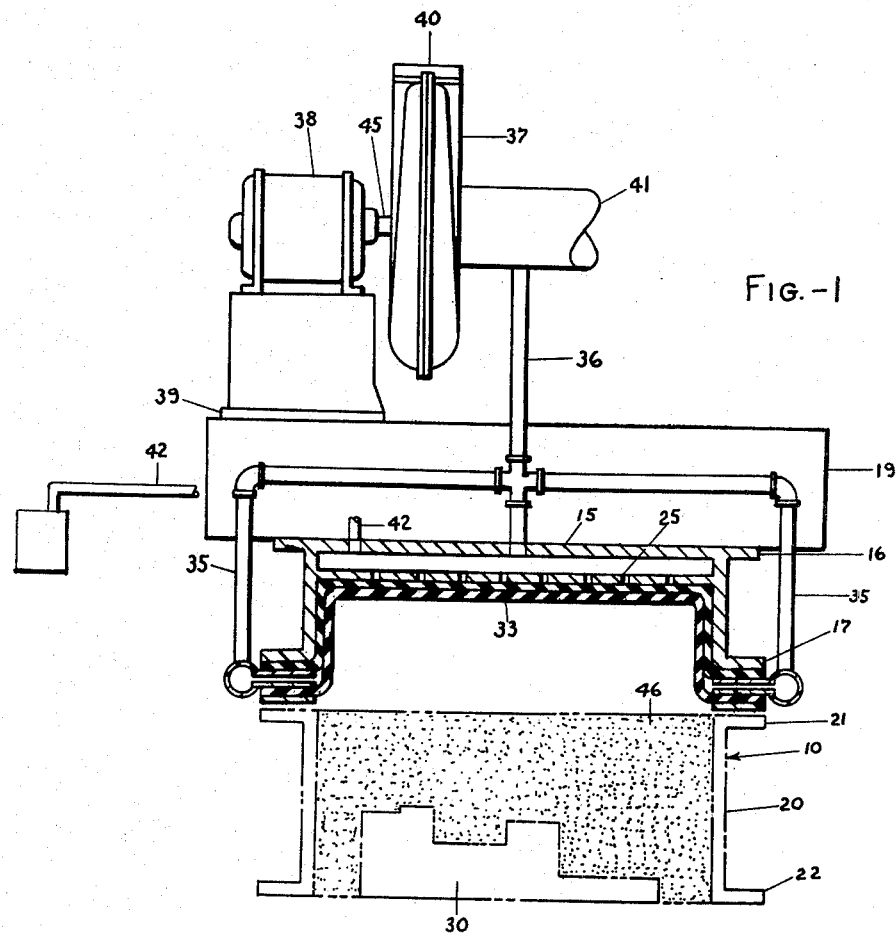

Dec. 6, 1960 R. W. TACCONE 2,962,776
DOUBLE DIAPHRAGM MOLDING MACHINE
Filed May 19, 1958

INVENTOR.
RUSSELL W. TACCONE
BY
*Charles L. Lauchback*
ATTORNEY

United States Patent Office 2,962,776
Patented Dec. 6, 1960

2,962,776
DOUBLE DIAPHRAGM MOLDING MACHINE

Russell W. Taccone, Erie, Pa., assignor to Taccone Pneumatic Foundry Equipment Corporation, North East, Pa., a corporation of Pennsylvania Filed May 19, 1958, Ser. No. 736,246

4 Claims. (Cl. 22—42)

This invention relates to molding machines and, more particularly, to machines for compressing sand in a flask over a pattern to form a mold for casting metal and the like.

This application constitutes an improvement over United States Patent No. 2,698,976 and utilizes several of the principles incorporated therein.

In the said patent, a single diaphragm is used in a molding machine to compress sand in a mold. In the present application, two diaphragms, one coextensive with the other, are used so that one of the diaphragms overlies the other while the other engages the same. One diaphragm forms a closure for the head of the machine so that even though the other diaphragm might be punctured in a great many places by a foreign object in the sand, air will not leak out of the first diaphragm. Therefore, the other diaphragm may be punctured in a great many places without interfering with the operation of the machine and requiring the upper diaphragm to be replaced.

In addition to this precaution, the areas of the diaphragms when in the molding position are great enough that they are greater than the area of the sand which one of them engages, thereby causing folds in the diaphragms and insuring that the diaphragms will not be under tension when in molding position and, therefore, not so likely to be punctured. The present machine further utilizes the vacuum which is used to draw the diaphragm up into the head between molding cycles to introduce a vacuum between the two diaphragms to thereby hold them together.

It is, accordingly, an object of this invention to provide an improved molding machine and, more specifically, it is an object of this invention to provide a molding machine which is simple in construction, economical to manufacture, and simple and efficient in operation.

Another object of the invention is to provide a molding machine which will not be subjected to puncturing the diaphragm during the normal course of use.

A further object of the invention is to provide an improved diaphragm and means for applying a pressure and vacuum thereto.

A still further object of the invention is to provide an improved machine with a double diaphragm.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
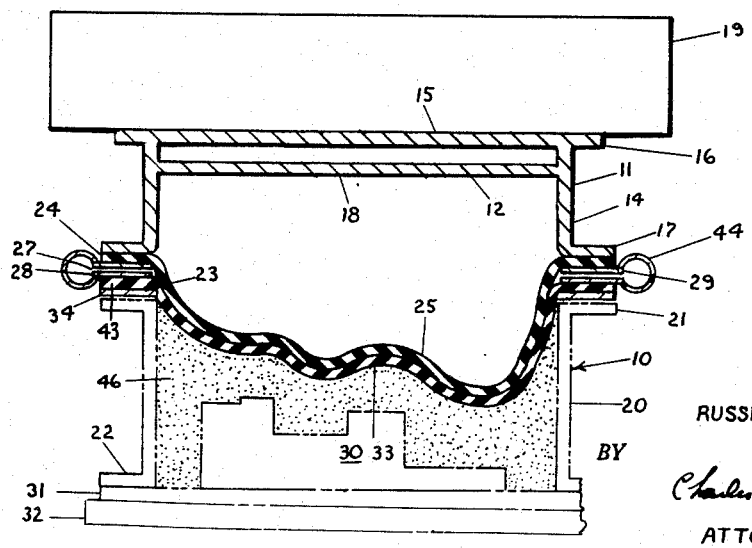

In the drawing:

Fig. 1 is a longitudinal cross sectional view of a machine according to the invention; and Fig. 2 is a view of the machine similar to that shown in Fig. 1 with certain parts deleted showing the machine with its diaphragm in molded position.

Now with more specific reference to the drawing, a molding machine 10 is shown having a head 11 with a top plate 12 on the head 11. The head 11 is made in the form of a rectangular box having a cavity therein into which an upper diaphragm 23 and a lower diaphragm 33 are drawn between molding cycles. The head 11 may be made of side plates 14 and an outer top plate 15 extending out to an outer edge 16 with a lower flange 17 extending outwardly therefrom and providing on its lower edge a shelf against which the diaphragm 23 may rest. A space 18 is provided between the top of the head 11 and the outer top plate 15 which provides a plenum chamber for receiving air under pressure from a source of compressed air applying pressure through a pipe 42. The plenum chamber allows air to be evacuated by means of a pump 37. A top casting 19 rests on top of the top plate 15 of the head 11.

A flask 20 is supported on a pattern plate 31 as shown and may be moved under the head 11 to the position shown or may be moved away from the head 11, either by moving it laterally as disclosed in Patent 2,715,758 or by moving it vertically as shown in Patent 2,698,976. Other means and mechanisms could be used to move the flask 20 and head 11 relative to each other. The flask 20 has an upper flange 21 and a lower flange 22 held together by an intermediate flange. A pattern 30 is supported on the pattern plate 31 which is in turn supported on a support 32.

The upper diaphragm 23 is made of an impervious material and has an intermediate portion 25 which overlies and is disposed in engagement with the lower diaphragm 33. The upper diaphragm 23 forms a closure for the cavity in the head 11 to receive air or to be evacuated to receive the diaphragm 33. Ends 24 of the upper diaphragm 23 are disposed between a plate 28 which has spaced, laterally disposed holds 27 therein for conducting air from a pipe 35 which is connected through a pipe 36 to an inlet 41 of the pump 37. The plate 28 has the shape of the top of the flange 17 and is disposed between peripheral ends 24 and 43, respectively, of the two diaphragms 23 and 33. The plate 28 is received in a slot 29 in a pipe 44 and welded thereto to form a closed passage from the space between the diaphragms 23 and 33 through the holes 27 into the pipe 44 and thence through the pipes 35 and 36 to the inlet 41 on the packing.

By applying a vacuum to the space between the two diaphragms 23 and 33, they are held together and move in unison, thereby preventing chaffing between the two diaphragms 23 and 33. Further, since the vacuum pump 37 is on at all times, the vacuum is introduced between the diaphragms 23 and 33 at all times.

The diaphragms 23 and 33 are clamped to the flange 17 by means of a clamping plate 34. A motor 38 is supported on a support 39 and drives an impeller through a shaft 45 in the vacuum pump 37. The pump 37 has the outlets 41 and 40 which draw air through the pipe 36 as aforesaid.

The flask 20 is disposed on the pattern plate 31 during molding and sand 46 is disposed over the pattern 30 therein. The sand 46 may be smoothly struck off as shown in Fig. 1 or it could be deposited in the flask 20 with a convex heaped upper surface, if so desired. After the sand 46 is deposited in the flask 20, the flask 20 is then moved under the head 11 of the machine to the position shown in Fig. 1 and air pressure is applied through the pipe 42 to the space between the head 11 and the diaphragm 23 which exerts a pressure between the upper diaphragm 23 and the top plate 12 of the head 11. The diaphragm 23 is then forced downwardly into packing relation with the sand 46 as shown in Fig. 2, compressing the sand 46 around the pattern 30.

The area of the diaphragm 23 when in the molding position as shown in Fig. 2 is greater than the area of the sand engaged thereby, thus insuring that no stress will be exerted on the diaphragm and since the lower diaphragm 33 engages the sand 46, if any sharp objects are present in the surface of the sand, they may puncture the lower diaphragm 33 but will be less inclined to pierce the upper diaphragm 23 and the upper diaphragm 23 will, therefore, be protected.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a head having an open cavity therein, a support for a flask, a flask adapted to be supported on said support, means to move said flask to a position adjacent said head, a diaphragm member comprising two separate sheets of material one being coextensive to the other during molding, means supporting said diaphragm member on said head to form a closure for the open cavity thereof, means to apply a vacuum in said cavity in said head to draw it into said head, and means to apply pressure in said cavity to force said diaphragm member into compressing relation with sand adapted to be supported in said flask, and means to exhaust air from between said sheets of material.

2. A molding machine comprising a tank open at the bottom, a pipe attached to said tank around the open side thereof, said pipe having a groove cut in the side thereof adjacent said tank, a plate having an opening in the center thereof and having its edges disposed in said groove, two sheets of flexible material one overlying the other, one said sheet having its edges disposed on one side of said plate and one on the other, openings in said plate communicating between the inside of said pipe and between said sheets, vacuum means for applying a vacuum to the space between said sheets through said openings and for applying a vacuum in said tank, and air pressure means to force said sheets out of said tank and into engagement with sand adapted to be supported below said tank.

3. The machine recited in claim 2 wherein one said sheet is air tight.

4. The machine recited in claim 3 wherein said sheets are of greater area than the area of sand engaged by one of said sheets.

References Cited in the file of this patent

UNITED STATES PATENTS

| 331,208 | Moore | Nov. 24, 1885 |
| 2,715,758 | Taccone | Aug. 23, 1955 |

FOREIGN PATENTS

| 801,574 | Germany | Jan. 11, 1951 |